United States Patent
Langhammer et al.

(10) Patent No.: US 8,539,014 B2
(45) Date of Patent: Sep. 17, 2013

(54) SOLVING LINEAR MATRICES IN AN INTEGRATED CIRCUIT DEVICE

(75) Inventors: Martin Langhammer, Alderbury (GB); Kulwinder Dhanoa, Old Windsor (GB)

(73) Assignee: Altera Corporation, San Jose, CA (US)

( * ) Notice: Subject to any disclaimer, the term of this patent is extended or adjusted under 35 U.S.C. 154(b) by 648 days.

(21) Appl. No.: 12/731,310

(22) Filed: Mar. 25, 2010

(65) Prior Publication Data

US 2011/0238720 A1    Sep. 29, 2011

(51) Int. Cl.
*G06F 7/38* (2006.01)
(52) U.S. Cl.
USPC .......................................................... 708/446
(58) Field of Classification Search
USPC .......................................................... 708/446
See application file for complete search history.

(56) References Cited

U.S. PATENT DOCUMENTS

| | | | |
|---|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,777,614 A | 10/1988 | Ward |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "Stratix II Device Handbook, Chapter 6—DSP Blocks in Stratix II Devices," v1.1, Jul. 2004.

(Continued)

*Primary Examiner* — Tan V. Mai
(74) *Attorney, Agent, or Firm* — Ropes & Gray LLP; Jeffrey H. Ingerman (57) ABSTRACT

Circuitry for solving linear matrix equations involving a resultant matrix, an unknown matrix and a product matrix that is a product of the resultant matrix and the unknown matrix includes matrix decomposition circuitry for triangulating an input matrix to create a resultant matrix having a plurality of resultant matrix elements on a diagonal, and having a further plurality of resultant matrix elements arranged in columns below the resultant matrix elements on the diagonal. The matrix decomposition circuitry includes an inverse square root multiplication path that computes diagonal elements of the resultant matrix having an inverse square root module, and the said inverse square root module computes inverses of the diagonal elements to be used in multiplication in place of division by a diagonal element. Latency is hidden by operating on each nth row of a plurality of matrices prior to any (n+1)th row.

13 Claims, 5 Drawing Sheets

(56) References Cited

U.S. PATENT DOCUMENTS

| | | |
|---|---|---|
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |

| | | |
|---|---|---|
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,801,925 B2 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B1 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,930,335 B2 | 4/2011 | Gura |
| 7,930,336 B2 | 4/2011 | Langhammer |
| 7,974,997 B2 | 7/2011 | Arviv et al. |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2007/0083585 A1 | 4/2007 | St. Denis et al. |
| 2007/0185951 A1 | 8/2007 | Lee et al. |
| 2007/0185952 A1 | 8/2007 | Langhammer et al. |
| 2007/0226287 A1 | 9/2007 | Lin et al. |
| 2007/0241773 A1 | 10/2007 | Hutchings et al. |
| 2008/0133627 A1 | 6/2008 | Langhammer et al. |
| 2008/0183783 A1 | 7/2008 | Tubbs |
| 2009/0028455 A1 | 1/2009 | Nakamura et al. |
| 2009/0172052 A1 | 7/2009 | DeLaquil et al. |
| 2009/0187615 A1 | 7/2009 | Abe et al. |
| 2009/0300088 A1 | 12/2009 | Michaels et al. |

| | | |
|---|---|---|
| 2010/0098189 A1 | 4/2010 | Oketani |
| 2012/0113133 A1 | 5/2012 | Shpigelblat |
| 2012/0191967 A1 | 7/2012 | Lin et al. |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Xilinx Inc., "Complex Multiplier v2.0", DS291 Product Specification/Datasheet, Nov. 2004.

Haynes, S.D., et al., "Configurable multiplier blocks for embedding in FPGAs," *Electronics Letters*, vol. 34, No. 7, pp. 638-639 (Apr. 2, 1998).

Altera Corporation, "FIR Compiler: MegaCore® Function User Guide," version 3.3.0, rev. 1, pp. 3 11 through 3 15 (Oct. 2005).

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference*, D5, Sep. 2003.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfiourable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg, B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings—Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A., "Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group, "Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings* (IEEE Cat. No. 96TH8140), Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics* (Cat. No. 99TH8465), vol. 3, Jul. 12-16, 1999, pp. 1522-1525.

Langhammer, M., "How to implement DSP in programmable logic," *Elettronica Oggi*, No. 266, Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on, a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

SOLVING LINEAR MATRICES IN AN INTEGRATED CIRCUIT DEVICE

BACKGROUND OF THE INVENTION

This invention relates to solving linear matrices in integrated circuit devices, and particularly in programmable integrated circuit devices such as programmable logic devices (PLDs).

Certain linear matrix equations may take the form RW=Z, where each of R, W and Z is a matrix and W contains the unknowns. This problem decomposes into a group of linear equations involving multiplication of elements of W by elements of R. To solve for the elements of W thus requires division by the elements of R. However, for some matrices, such as a 4×4 matrix typically found in an LTE application, implementing a divide operation in circuitry may consume as much resources as the remainder of the datapath combined. Moreover, latency through the divider can be greater than the latency through the remainder of the datapath.

SUMMARY OF THE INVENTION

The present invention relates to simplified circuitry for solving certain linear matrix problems by turning the aforementioned division into a multiplication. This eliminates the need for resource-consuming, latency increasing division circuitry. Latency may be further reduced by solving a plurality of matrices at once. The circuitry can be provided in a fixed logic device, or can be configured into a programmable integrated circuit device such as a programmable logic device (PLD).

As explained in copending, commonly-assigned U.S. patent application Ser. No. 12/072,144, filed Feb. 25, 2008, which is hereby incorporated by reference herein in its entirety, certain linear matrix equations may be solved using Cholesky decomposition to factor a matrix, followed by a forward or back substitution. The result of the Cholesky decomposition may be a "triangulated" matrix—i.e., a matrix with no values above the diagonal.

As just one example, The following sequence of equations show an example of forward substitution with a lower triangular matrix R.

$$RW = Z'$$

$$R = \begin{bmatrix} 5 & 0 & 0 \\ 3 & 2 & 0 \\ 6 & 4 & 1 \end{bmatrix}$$

$$W = \begin{bmatrix} w_1 \\ w_2 \\ w_3 \end{bmatrix}$$

$$Z' = \begin{bmatrix} 10 \\ 8 \\ 20 \end{bmatrix}$$

$$5w_1 = 10 \Rightarrow w_1 = 2$$

$$2w_2 + 3w_1 = 8 \Rightarrow 2w_2 + 3.2 = 8 \Rightarrow w_2 = 1$$

$$w_3 + 4w_2 + 6w_1 = 20 \Rightarrow w_3 + 4.1 + 6.2 = 20 \Rightarrow w_3 = 4$$

Because R is a lower triangular matrix, the first row results in one equation in one unknown, which is on the diagonal. Solving each row reduces the subsequent row to one equation in one unknown, each unknown being on the diagonal. Therefore, each solution requires division by a term on the diagonal.

In Cholesky decomposition, to factor a matrix a, the first element $l_{jj}$, at the top of each column in the resultant triangulated matrix l, may be calculated as:

$$l_{jj} = \sqrt{a_{jj} - \langle L_j, L_j \rangle}$$

where $a_{jj}$ is the jjth element of the original matrix a, and $L_j$ is vector representing the jth row of matrix l up to the (j−1)th column. The subsequent elements in the jth column may be calculated as:

$$l_{ij} = \frac{a_{ij} - \langle L_i, L_j \rangle}{l_{jj}}$$

where $a_{ij}$ is the ijth element of the original matrix a, and $L_i$ is vector representing the portion of the ith row of matrix l up to the (j−1)th column.

As disclosed in copending, commonly-assigned U.S. patent application Ser. No. 12/557,846, filed Sep. 11, 2009 and hereby incorporated by reference herein in its entirety, if the first of the two equations above is substituted into the second equation, the result is the following:

$$l_{ij} = \frac{a_{ij} - \langle L_i, L_j \rangle}{\sqrt{a_{jj} - \langle L_j, L_j \rangle}}$$

When any $l_{ij}$ term is calculated this way, the latency in calculating the $l_{jj}$ term in the denominator has little or no effect on the $l_{ij}$ term calculation, if the quantity that whose square root is being taken for the $l_{jj}$ term is identical in structure to the numerator (although having different values). The denominator term (before the square root is taken) and all of the following numerator terms can be burst into the same datapath, while the denominator term is latched and used as the input to a second datapath. The second datapath multiplies the datapath output by the inverse square root of the latched value. And if the calculations are properly pipelined, once the pipeline is filled, a new term can be output on each clock cycle.

The diagonal of the resulting lower triangular matrix has all real terms $l_{jj}$, even if the remaining terms are complex. Therefore, there is unused memory allocated to each term of the diagonal, intended to store a nonexistent imaginary part. This unused memory can be used to store the inverse of each term of the diagonal, turning the required division described above for solution of each unknown into a multiplication, which is consumes fewer resources than a division. Moreover, each term of the diagonal is in the form $l_{jj}=x/(x^{0.5})$ which is equal to $x^{0.5}$, meaning that $1/l_{jj}$ is equal to $x^{-0.5}$, which is already computed in the calculation of $l_{jj}$. Therefore, no additional resources are used in either the calculation or storage of the $1/l_{jj}$ terms.

Therefore, in accordance with the present invention, there is provided circuitry for solving linear matrix equations involving a resultant matrix, an unknown matrix and a product matrix that is a product of said resultant matrix and said unknown matrix. The circuitry includes matrix decomposition circuitry for triangulating an input matrix to create a resultant matrix having a plurality of resultant matrix elements on a diagonal, and having a further plurality of resultant matrix elements arranged in columns below the resultant matrix elements on the diagonal. The matrix decomposition circuitry includes an inverse square root multiplication path that computes diagonal elements of the resultant matrix. The circuitry for solving linear matrix equations further includes first, second and third matrix memories for respectively storing the resultant matrix, the unknown matrix and the product matrix. The inverse square root multiplication path includes an inverse square root module, and the said inverse square root module computes inverses of the diagonal elements. When solution of a linear matrix equation involves division by a diagonal element, multiplication by the inverse of that diagonal element may be used instead.

A method of configuring a programmable integrated circuit device as such circuitry, and a programmable integrated circuit device so programmed, are also provided. In addition, a machine-readable data storage medium encoded with machine-executable instructions for so configuring a programmable integrated circuit device is provided.

Finally, a method of operating the circuitry to hide latency is provided, in which a respective plurality of at least one of the resultant matrix and the product matrix is stored in a respective one of the first and third matrix memories. Each row of each matrix in the first and third matrix memories has a row index, with row indices repeating from one matrix in each respective plurality of matrices to another matrix in that respective plurality of matrices. For each row index, all rows in each matrix in at least one of the respective plurality of matrices having that row index are processed prior to processing any rows of any matrix in that at least one of the respective plurality of matrices having any other row index.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Taking an example of lower triangular matrix l of dimensions 6×6, the elements on the diagonal are $l_{11}, \ldots, l_{66}$. In each jth column, the elements under $l_{jj}$ are $l_{ij}$, $i=j+1, \ldots, i_{max}$ (in this case, $i_{max}=6$). The matrix may be considered to be empty above the diagonal, or the elements above the diagonal may be considered to be zeroes.

Each element $l_{ij}$ can be calculated using two datapaths. The first datapath calculates the following result:

$$l_x = a_x - \langle L_x, L_x \rangle$$

where for l and a, x=ij; for the L vectors, x=i or j, respectively; and $\langle L_x, L_x \rangle$ denotes the inner product of the L vectors.

The first output (x=jj) of the first datapath is latched at the input of a second datapath, which calculates the actual $l_{ij}$. The first element of the column ($l_{jj}$) is calculated as the inverse square root of the input ($a_{jj} - \langle L_j, L_j \rangle$), multiplied by the input, generating the square root of the input. The inverse square root is used instead of a direct square root calculation, because it can be reused for the following elements in the column using multiplication, which is easier to implement than division.

To calculate all of the subsequent values in the column, the latched first datapath output is used for the inverse square root input which is a first multiplier input, and the other multiplier input is, for each subsequent term, the corresponding output of the first datapath. The entire column can therefore be calculated without waiting for any individual element to be finished.

Figure 1:
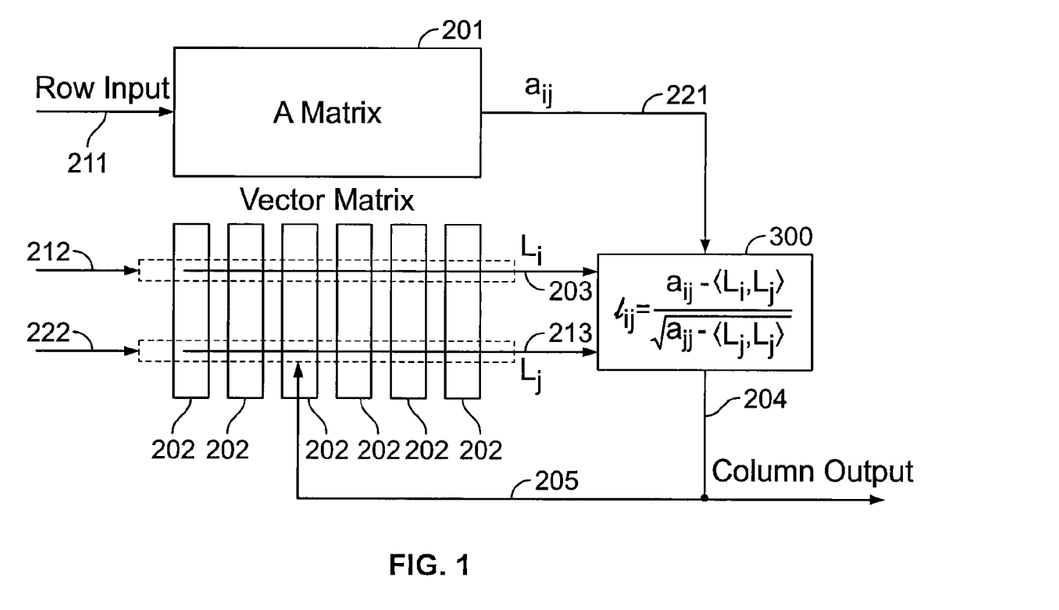
FIG. 1 shows one embodiment of a datapath arrangement for Cholesky decomposition.

FIG. 1 shows how the matrix values can be stored for fast access. Each $a_{ij}$ value is a single number that can be addressed in a single clock cycle, but each $L_i$ or $L_j$ row vector is j−1 numbers which would require j−1 clock cycles to address if all values were stored in a single memory. However, in accordance with an embodiment of the present invention, matrix a may be stored in a single memory 201, while each column of matrix l may be stored in one of a plurality of $i_{max}$ separate memories 202. The ith element of each of the separate column memories can be addressed simultaneously, allowing the entire row vector to be read out within a single clock cycle. This may be referred to as a "column-wise" memory architecture.

For example, programmable logic devices available from Altera Corporation, of San Jose, Calif., may have a smaller number of larger memory blocks (e.g., 144 kb memory blocks), one of which could be used as memory 201 to store matrix a, and a larger number of smaller memory blocks (e.g., 9 kb memory blocks), $i_{max}$ of which could be used as memories 202 to separately store the columns of matrix l. Of course, it is not necessary to use different sizes of memories for memories 201, 202; if a sufficient number of larger memories is available, any one or more of the memories used as column memories 202 to separately store the columns of matrix l may be the same size as (or even larger than) the memory used as memory 201 to store matrix a.

Thus, in a single clock cycle, address input 211 may be applied to memory 201 to read out matrix element $a_{ij}$ at 221 for input to calculation datapath 300, while address input 212 may be applied to the appropriate j−1 memories 202 on path 203 to read out vector $L_i$, and address input 222 may be applied to the appropriate j−1 memories 202 on path 213 to read out vector $L_j$. The outputs 221, 203, 213 maybe input to calculation datapath 300, described in more detail in connection with FIG. 2, which outputs the individual $l_{ij}$ values at 204, and also feeds each back at 205 into the respective jth column memory 202.

Figure 2:
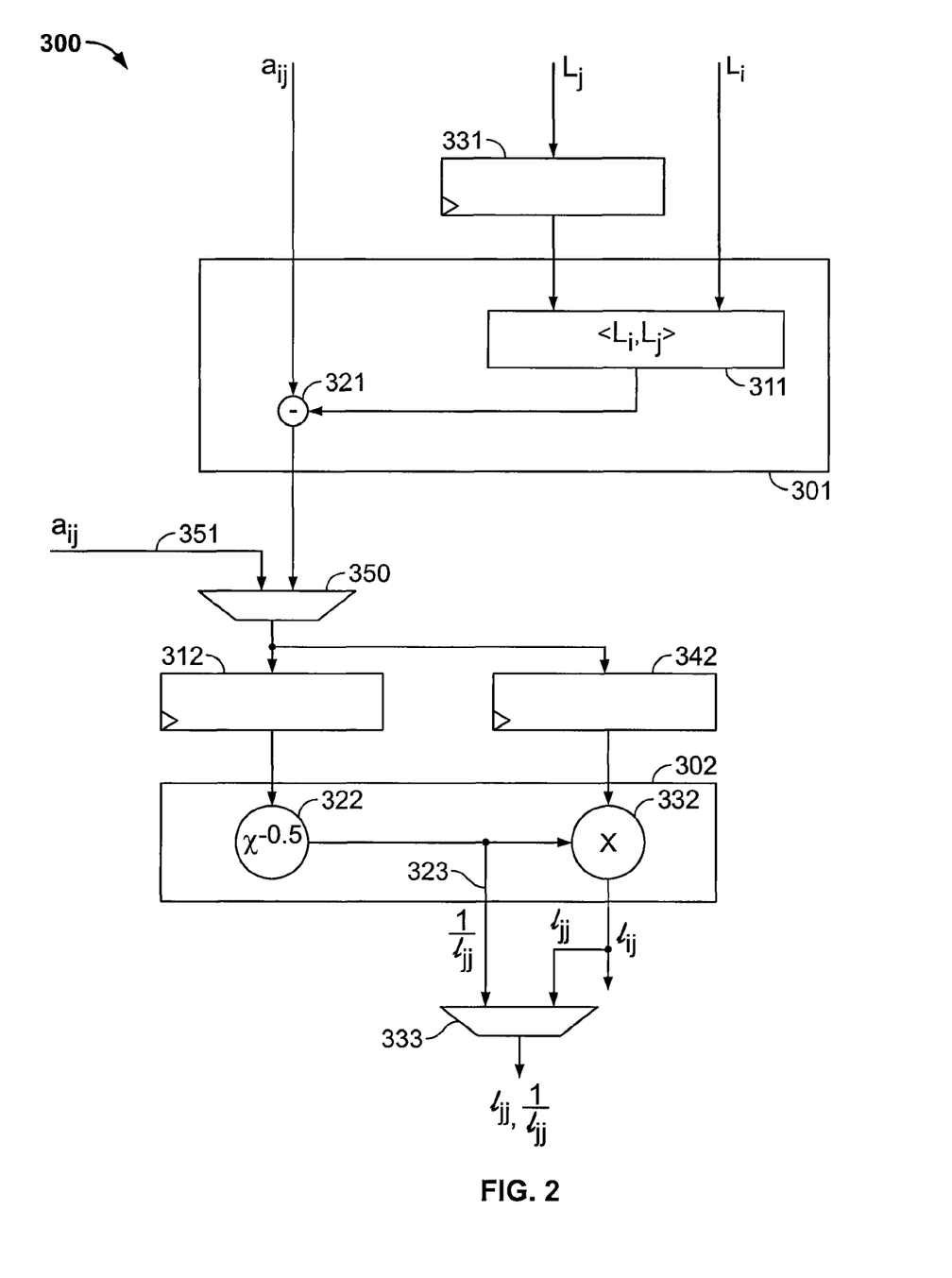
FIG. 2 shows one embodiment, according to the invention, of a circuit arrangement used in the performance of Cholesky decomposition.

Datapath 300, which may be implemented in fixed or programmable logic, includes inner product datapath 301 and inverse square root datapath 302.

Inner product datapath 301 includes inner product generator 311 and subtractor 321 to subtract the inner product from $a_{ij}$. Inner product generator 311 may include a sufficient plurality of multipliers and adders to simultaneously multiply $i_{max}$ pairs of values, and then add those products together.

For complex vectors, inner product generator 311 may include sufficient multipliers and adders to simultaneously multiply $2(i_{max})$ pairs of values, and also may include the necessary components to compute the complex conjugate values for $L_j$ in the case where the values are complex. The $L_j$ term is latched in register 331 at the beginning of a column process and is not changed until the next column is started.

Starting with the second column, the first output of inner product datapath 301 for each column—i.e., each $l_{jj}$—is latched into register 312 as the input to inverse square root datapath 302 for the duration of calculation of that column. Inverse square root datapath 302 includes inverse square root module 322 for calculating the inverse square root of $l_{jj}$, and multiplier 332 for multiplying the inverse square root by the current $l_{ij}$. The latching of $l_{jj}$ into register 312 delays its input to multiplier 332 by one clock cycle. Therefore, the input of $l_{ij}$ to multiplier 332 also is delayed, by register 342, so that latency is the same for both inputs.

For the first column, terms are generated using simple division. The top term, $l_{11}$ is $a_{11}^{-0.5}$ and all the subsequent inputs for the first column are also divided by $a_{11}$—i.e., $l_{i1} = a_{i1}/a_{11}^{-0.5}$. This is accomplished using multiplexer 350 to allow the $a_{ij}$ inputs 351 to bypass inner product datapath 301.

In addition to increasing the number of multipliers and adders in inner product generator 311, as discussed above, some other relatively minor additions (not shown) would be made to datapath 300 where the inputs are complex. In such a case, the $L_i$, $L_j$ vector values will be complex. This will require generating the complex conjugate of the vector value latched in register 331. That can be done by providing logic to invert the sign bit of the imaginary portion of each value. The changes required in inverse square root datapath 302 are simplified by the nature of matrix l.

As discussed above, the diagonal value—i.e., the first value at the top of each column in the Cholesky decomposition—is always real, meaning that inverse square root calculation 322 will always be real. Therefore, while the other multiplicand at multiplier 332 is complex, the multiplication will be one of a complex value by a real scalar value, so only two multipliers—i.e., one additional multiplier—are required. Moreover, a memory location for the imaginary part of each diagonal value $l_{jj}$ will be unused, and available for storing $1/l_{jj}$. That value can be extracted from inverse square root calculation 322 at 323 whenever i=j, and can be multiplexed together at 333 with the output of multiplier 332 for storage in place of the imaginary part of $l_{jj}$.

As discussed above, for any given row of the RW=Z matrix calculation example given above, the w element calculation can be described as:

$$w(k) = \frac{z(k) - r(k, 1:k-1)w(1:k-1)}{r(k,k)}$$

This can be rewritten as follows:

$$w(k) = (z(k) - r(k, 1:k-1)w(1:k-1)) * \frac{1}{r(k,k)}$$

turning the division into a multiplication.

Figure 3:
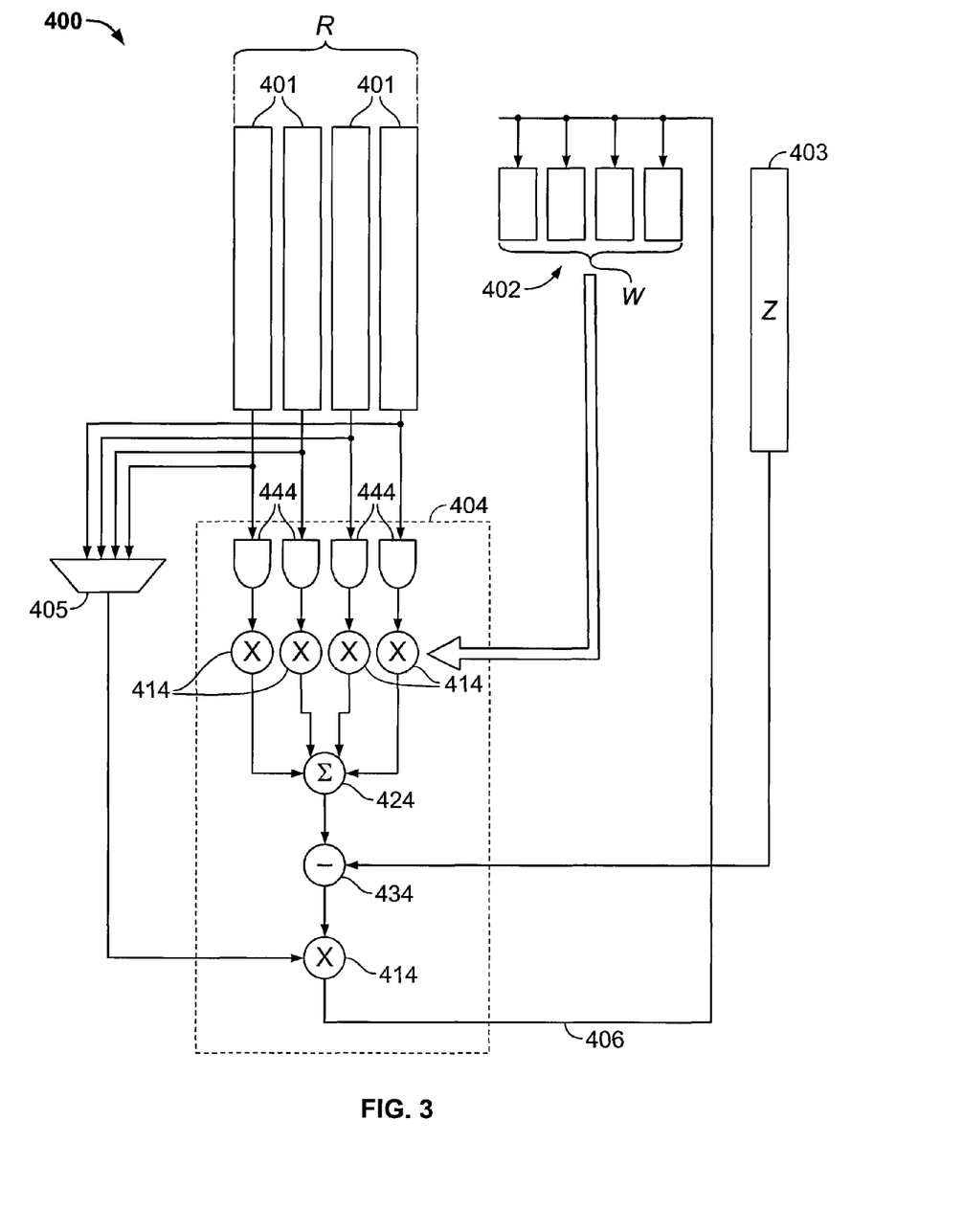
FIG. 3 shows one embodiment, according to the invention, of a datapath arrangement, which may be implemented in circuitry, for solving matrices using back/forward substitution.

FIG. 3 shows the architecture of an embodiment 400 of substitution datapath/circuitry in accordance with the invention. The R matrix may stored in columns, with one memory 401 provided per column, and each row containing one entry per column memory. Multiple matrixes may be stored, and preferably are processed together. The W memory 402 does not have to be initialized. The Z memory 403 may be loaded with one Z vector per R matrix in memories 401. Alternatively, one Z vector can be used for multiple R matrices, or vice-versa.

A row of the R matrix may be loaded by loading similarly indexed elements from each of the R column memories 401, along with the entire W vector from memory 402, and a single element with the same row index from the Z memory 403. The number of elements from both the R row and the W matrix that are read into the vector core 404 is row_index−1 (the remaining elements may be zeroed).

Multipliers 414, summer 424 and subtractor 434 of core 404 compute the equation set forth above for each element of W, as multiplexer 405 selects the appropriate inverted diagonal value from the row_indexedth element of the Rth row.

AND gates 444 can be used to zero columns that are not used in the current row. For example if there are four rows in each triangulated matrix, the first row will have one element, the second row will have two elements, and so on. If for Row 1, one zeroes out columns 2,3,4, for Row 2 one zeroes out columns 3,4 and so on, then it is not necessary to initialize the upper half of R memory 401 with zeroes, but only the lower half with the values of the triangulated matrix R.

Preferably, the first row index for each of the R matrices in R memory is processed first, then the second row index, then the third, and so on. If the number of R matrices processed at any given time is greater than the datapath and memory latency, which may be about typically about 14 clock cycles for a multiplier-based calculation shown in FIG. 3 using the multipliers and adders of digital signal processing blocks of FPGAs in the STRATIX® family of FPGAs from Altera Corporation, of San Jose, Calif., then processing all nth rows together will hide the datapath latency. By comparison, if a divider were used, datapath latency would be about 30 clock cycles, requiring a larger matrix memory, and resulting in a longer processing delay because of the large number of matrices needed to hide datapath latency.

The W vectors can be unloaded from W memory. Alternatively, the W values can be written to a W output memory (not shown), which can be loaded sequentially from output 406, which would save the requirement for a multiplexer on the output of the W memories when unloading.

The various operators used for the calculations described above can be configured in a programmable device using, e.g., the techniques described in copending, commonly-assigned U.S. patent application Ser. No. 11/625,655, filed Jan. 22, 2007, which is hereby incorporated by reference herein in its entirety.

One potential use for the present invention may be in programmable integrated circuit devices such as programmable logic devices, where programming software can be provided to allow users to configure a programmable device to perform matrix operations. The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out a method according to this invention for programming a programmable device to perform matrix decomposition may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 4:
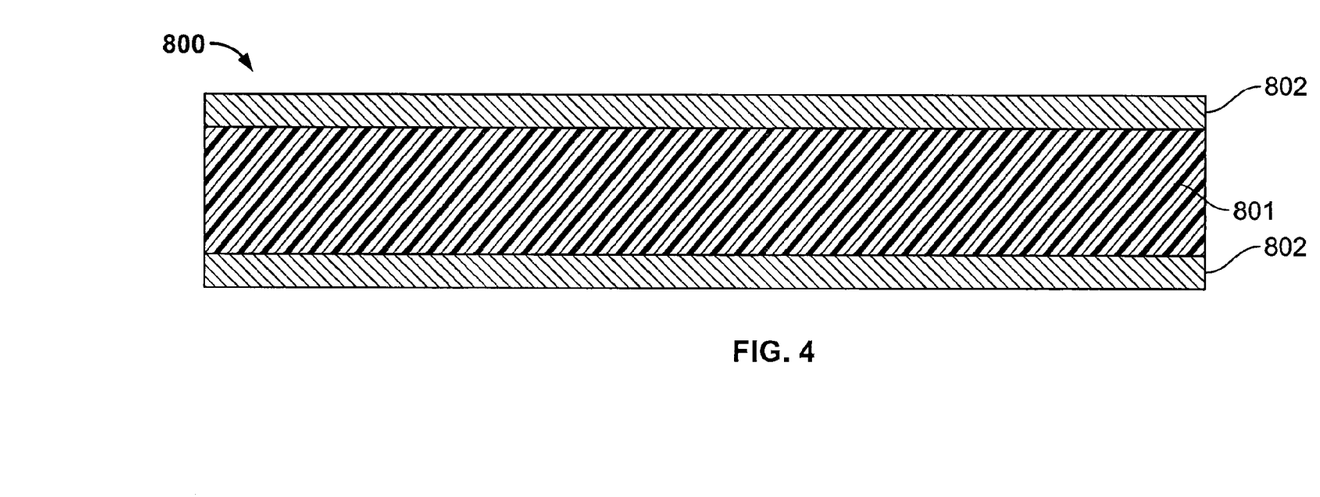
FIG. 4 is a cross-sectional view of a magnetic data storage medium encoded with a set of machine-executable instructions for performing the method according to the present invention.

FIG. 4 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 5:
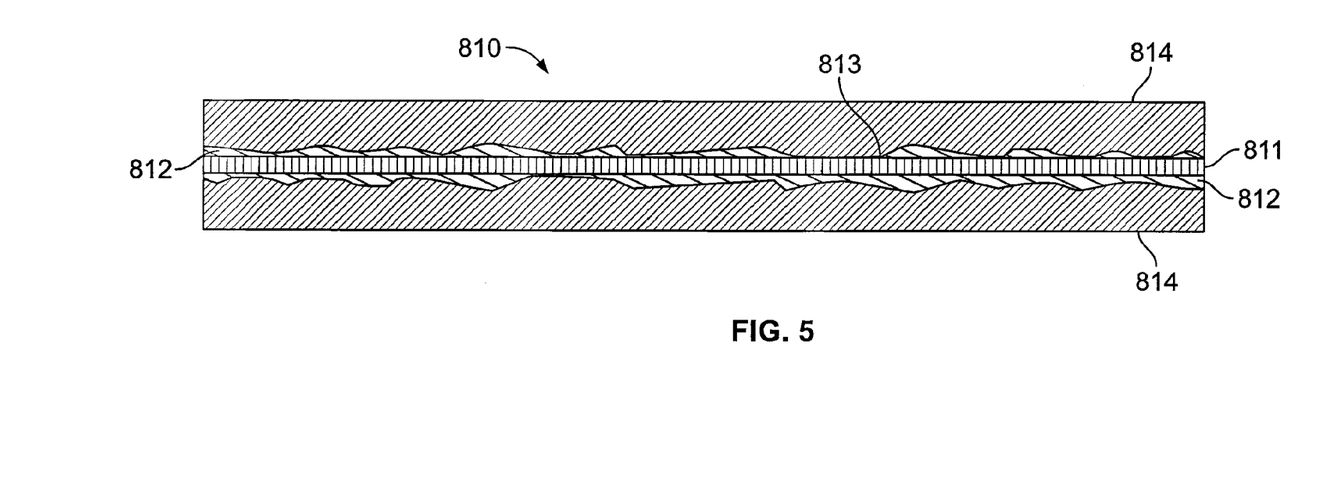
FIG. 5 is a cross-sectional view of an optically readable data storage medium encoded with a set of machine executable instructions for performing the method according to the present invention.

FIG. 5 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 6:
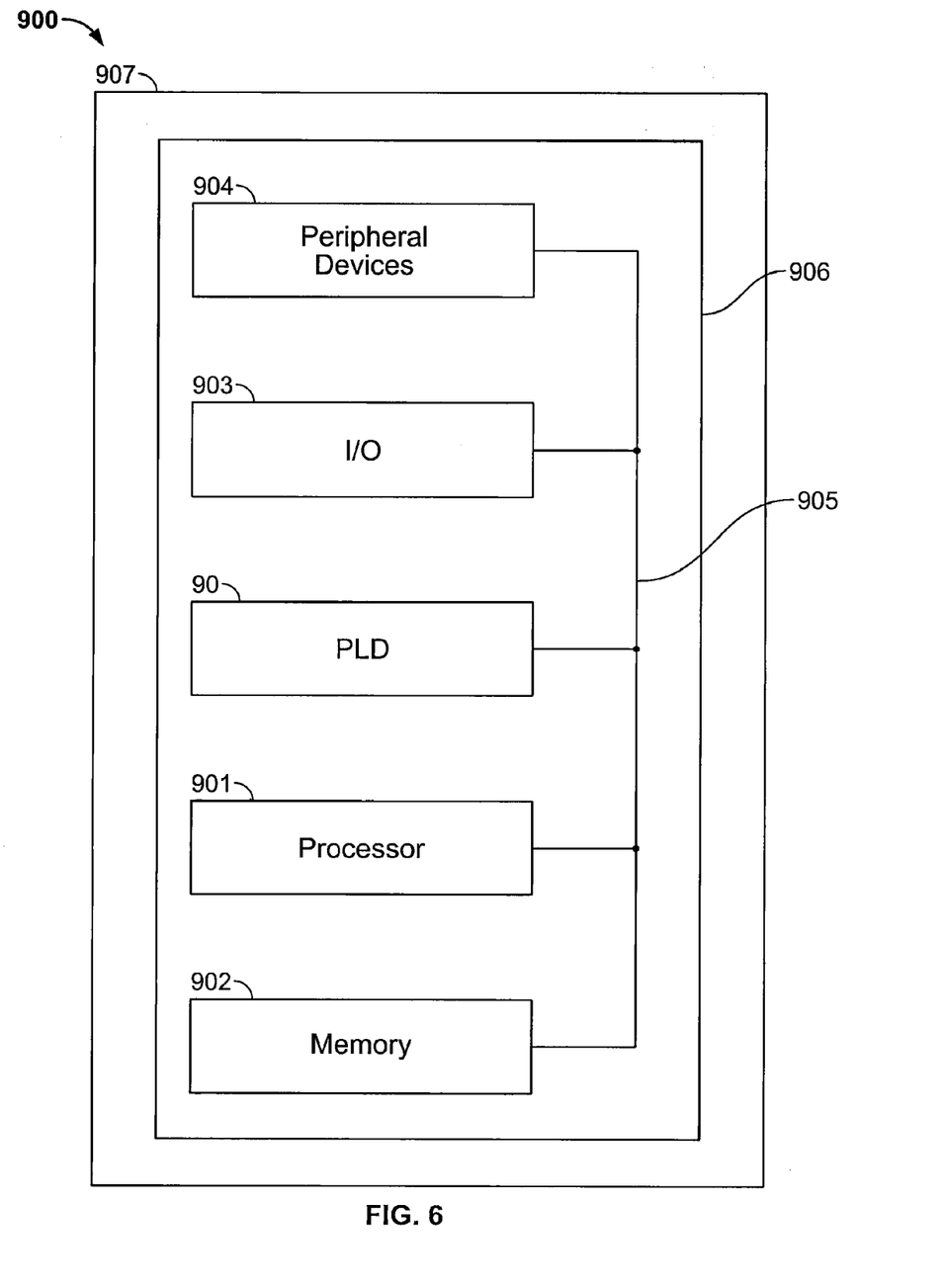
FIG. 6 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for solving linear matrix equations involving a resultant matrix, an unknown matrix and a product matrix that is a product of said resultant matrix and said unknown matrix, said circuitry comprising:
   matrix decomposition circuitry for triangulating an input matrix to create a resultant matrix having a plurality of resultant matrix elements on a diagonal, and having a further plurality of resultant matrix elements arranged in columns below said resultant matrix elements on said diagonal, said matrix decomposition circuitry comprising an inverse square root multiplication path that computes diagonal elements of said resultant matrix; and
   first, second and third matrix memories for respectively storing said resultant matrix, said unknown matrix and said product matrix; wherein:
   said inverse square root multiplication path includes an inverse square root module, and
   said inverse square root module computes inverses of said diagonal elements.

2. The circuitry of claim 1 wherein:
   said first matrix memory stores each element of said resultant matrix as a real and imaginary part;
   each said diagonal element has only a real part; and
   respective ones of said inverses of said diagonal elements are stored in place of nonexistent imaginary parts of respective ones of said diagonal elements.

3. The circuitry of claim 1 further comprising:
   multipliers and a summing circuit for forming an inner product of corresponding rows of said resultant matrix and said unknown matrix;
   a subtractor for respectively subtracting said inner product from respective elements of said product matrix to yield respective differences; and a further multiplier for multiplying each respective difference by a respective one of said inverses of said diagonal elements to determine respective elements of said unknown matrix.

4. A method of operating circuitry for solving linear matrix equations involving a resultant matrix, an unknown matrix and a product matrix that is a product of said resultant matrix and said unknown matrix, said circuitry comprising matrix decomposition circuitry for triangulating an input matrix to create a resultant matrix having a plurality of resultant matrix elements on a diagonal, and having a further plurality of resultant matrix elements arranged in columns below said resultant matrix elements on said diagonal, said matrix decomposition circuitry comprising an inverse square root multiplication path that computes diagonal elements of said resultant matrix, said circuitry further comprising first, second and third matrix memories for respectively storing said resultant matrix, said unknown matrix and said product matrix; wherein said inverse square root multiplication path includes an inverse square root module, and said inverse square root module computes inverses of said diagonal elements wherein said inverse square root multiplication path includes an inverse square root module, and said inverse square root module computes inverses of said diagonal elements; said method comprising:
  storing a respective plurality of at least one of said resultant matrix and said product matrix in a respective one of said first and third matrix memories, each row of each matrix in said first and third matrix memories having a row index, wherein row indices repeat from one matrix in each respective plurality of matrices to another matrix in said respective plurality of matrices; and
  for each row index, processing all rows in each matrix in at least one of said respective plurality of matrices having said row index prior to processing any rows of any matrix in said at least one of said respective plurality of matrices having any other row index.

5. A method of configuring a programmable integrated circuit device as circuitry for solving linear matrix equations involving a resultant matrix, an unknown matrix and a product matrix that is a product of said resultant matrix and said unknown matrix, said method comprising:
  configuring logic of said programmable integrated circuit device as matrix decomposition circuitry for triangulating an input matrix to create a resultant matrix having a plurality of resultant matrix elements on a diagonal, and having a further plurality of resultant matrix elements arranged in columns below said resultant matrix elements on said diagonal, comprising configuring logic of said programmable integrated circuit device as an inverse square root multiplication path that computes diagonal elements of said resultant matrix; and
  configuring memory of said programmable integrated circuit device as first, second and third matrix memories for respectively storing said resultant matrix, said unknown matrix and said product matrix; wherein:
  said inverse square root multiplication path includes an inverse square root module, and
  said inverse square root module computes inverses of said diagonal elements.

6. The method of claim 5 wherein:
  each said diagonal element has only a real part;
  said method further comprises configuring said first matrix memory to store each element of said resultant matrix as a real and imaginary part; and
  respective ones of said inverses of said diagonal elements are stored in place of nonexistent imaginary parts of respective ones of said diagonal elements.

7. The method of claim 5 further comprising:
  configuring logic of said programmable integrated circuit device as multipliers and a summing circuit for forming an inner product of corresponding rows of said resultant matrix and said unknown matrix;
  configuring logic of said programmable integrated circuit device as a subtractor for respectively subtracting said inner product from respective elements of said product matrix to yield respective differences; and
  configuring logic of said programmable integrated circuit device as a further multiplier for multiplying each respective difference by a respective one of said inverses of said diagonal elements to determine respective elements of said unknown matrix.

8. A programmable integrated circuit device configured as circuitry for solving linear matrix equations involving a resultant matrix, an unknown matrix and a product matrix that is a product of said resultant matrix and said unknown matrix, said programmable integrated circuit device comprising:
  logic configured as matrix decomposition circuitry for triangulating an input matrix to create a resultant matrix having a plurality of resultant matrix elements on a diagonal, and having a further plurality of resultant matrix elements arranged in columns below said resultant matrix elements on said diagonal, comprising logic configured as an inverse square root multiplication path that computes diagonal elements of said resultant matrix; and
  logic configured as first, second and third matrix memories for respectively storing said resultant matrix, said unknown matrix and said product matrix; wherein:
  said inverse square root multiplication path includes an inverse square root module, and
  said inverse square root module computes inverses of said diagonal elements.

9. The configured programmable integrated circuit device of claim 8 wherein:
  each said diagonal element has only a real part;
  said first matrix memory is configured to store each element of said resultant matrix as a real and imaginary part; and
  respective ones of said inverses of said diagonal elements are stored in place of nonexistent imaginary parts of respective ones of said diagonal elements.

10. The configured programmable integrated circuit device of claim 8 further comprising:
  logic configured as multipliers and a summing circuit for forming an inner product of corresponding rows of said resultant matrix and said unknown matrix;
  logic configured as a subtractor for respectively subtracting said inner product from respective elements of said product matrix to yield respective differences; and
  logic configured as a further multiplier for multiplying each respective difference by a respective one of said inverses of said diagonal elements to determine respective elements of said unknown matrix.

11. A machine-readable data storage medium encoded with machine-executable instructions for configuring a programmable integrated circuit device as circuitry for solving linear matrix equations involving a resultant matrix, an unknown matrix and a product matrix that is a product of said resultant matrix and said unknown matrix, said instructions comprising:

instructions to configure logic of said programmable integrated circuit device as matrix decomposition circuitry for triangulating an input matrix to create a resultant matrix having a plurality of resultant matrix elements on a diagonal, and having a further plurality of resultant matrix elements arranged in columns below said resultant matrix elements on said diagonal, comprising instructions to configure logic of said programmable integrated circuit device as an inverse square root multiplication path that computes diagonal elements of said resultant matrix; and instructions to configure memory of said programmable integrated circuit device as first, second and third matrix memories for respectively storing said resultant matrix, said unknown matrix and said product matrix; wherein:

said inverse square root multiplication path includes an inverse square root module, and said inverse square root module computes inverses of said diagonal elements.

12. The machine-readable data storage medium of claim 11 wherein:

each said diagonal element has only a real part;

said instructions to configure said first matrix memory comprise instructions to configure said first matrix memory to store each element of said resultant matrix as a real and imaginary part; and respective ones of said inverses of said diagonal elements are stored in place of nonexistent imaginary parts of respective ones of said diagonal elements.

13. The machine-readable data storage medium of claim 11 wherein said instructions further comprise:

instructions to configure logic of said programmable integrated circuit device as multipliers and a summing circuit for forming an inner product of corresponding rows of said resultant matrix and said unknown matrix;

instructions to configure logic of said programmable integrated circuit device as a subtractor for respectively subtracting said inner product from respective elements of said product matrix to yield respective differences; and instructions to configure logic of said programmable integrated circuit device as a further multiplier for multiplying each respective difference by a respective one of said inverses of said diagonal elements to determine respective elements of said unknown matrix.

* * * * *